(12) United States Patent
Onishi

(10) Patent No.: US 6,402,998 B1
(45) Date of Patent: Jun. 11, 2002

(54) MOTOR-DRIVEN MOLD CLAMPING DEVICE

(75) Inventor: Masashi Onishi, Chiba (JP)

(73) Assignee: Sumitomo Heavy Industries, Ltd., Shinagawa (JP)

(*) Notice: Subject to any disclaimer, the term of this patent is extended or adjusted under 35 U.S.C. 154(b) by 0 days.

(21) Appl. No.: 09/335,925

(22) Filed: Jun. 18, 1999

(30) Foreign Application Priority Data

Jun. 19, 1998 (JP) .......................................... 10-172468

(51) Int. Cl.$^7$ .............................................. B29C 45/76
(52) U.S. Cl. ........................ 264/40.5; 425/150; 425/593
(58) Field of Search ................................ 425/150, 593; 264/40.1, 40.5, 328.1

(56) References Cited

U.S. PATENT DOCUMENTS

| | | | | |
|---|---|---|---|---|
| 3,534,442 A | * | 10/1970 | Mahle | 425/150 |
| 4,726,920 A | | 2/1988 | Yokota | 264/40.5 |
| 4,832,884 A | * | 5/1989 | Speck et al. | 425/150 |
| 4,900,242 A | * | 2/1990 | Maus et al. | 425/150 |
| 5,059,365 A | * | 10/1991 | Hertzer et al. | 425/150 |
| 5,149,471 A | * | 9/1992 | Cantanzaro et al. | 425/150 |
| 5,164,203 A | * | 11/1992 | Tanaka et al. | 425/150 |
| 5,279,778 A | * | 1/1994 | Taira et al. | 425/150 |
| 5,582,782 A | * | 12/1996 | Kato et al. | 425/150 |
| 5,861,118 A | * | 1/1999 | Hokino et al. | 425/150 |
| 5,945,047 A | * | 8/1999 | Yukihiro et al. | 425/150 |

FOREIGN PATENT DOCUMENTS

| | | |
|---|---|---|
| JP | 62-021517 | 1/1987 |
| JP | 62-71620 | 4/1987 |
| JP | 63-116827 | 5/1988 |
| JP | 3-56654 | 8/1991 |
| JP | 4-69223 | 3/1992 |
| JP | 8-309779 | 11/1996 |
| JP | 9-164571 | 6/1997 |

\* cited by examiner

*Primary Examiner*—James P. Mackey
(74) *Attorney, Agent, or Firm*—Arent Fox Kintner Plotkin & Kahn

(57) ABSTRACT

A motor-driven mold clamping device includes a servo motor and a movable platen, with a toggle mechanism driven by the servo motor to advance and retract the movable platen for clamping a mold. The toggle mechanism has a crosshead associated with the movable platen. A setting unit is provided for setting a position of the movable platen, and a position detector is provided for detecting a position of the crosshead. A control unit is provided for approximating a correlation between the position of the crosshead and the position of the movable platen by using at least one mathematical function of a quadratic or higher order. The control unit calculates a calculated position of the crosshead by the at least one mathematical function with the position of the movable platen set by using the setting unit to control the position of the crosshead for the control of the mold opening and mold closing positions. The control of the position of the crosshead is made in accordance with the detected position supplied from the position detector and the calculated crosshead position.

13 Claims, 4 Drawing Sheets

MOTOR-DRIVEN MOLD CLAMPING DEVICE

BACKGROUND OF THE INVENTION

1. Field of the Invention

The present invention relates to a motor-driven mold clamping device for a motor-driven injection molding machine.

Motor-driven injection molding machines have gradually replaced hydraulic ones and increasingly been used in recent years. One reason lies in their simple configuration as compared with the hydraulic injection molding machines because of the non-necessity of a hydraulic pump, hydraulic tubes and valves. In addition, a servo motor used for the source of power allows the easier control of the motor-driven injection molding machines. The servo motors are used in most cases for an injection device and a mold clamping device.

2. Description of the Related Art

In the mold clamping device, a toggle system is often used. The toggle system uses a toggle mechanism to double the force generated by the servo motor which is then transmitted to a mold by means of a toggle link. The mold clamping devices of the type described are undergoing changes and refinements. An example of an improved mold clamping device is disclosed in Japanese Patent Publication No. 3-56654 (56654/1991). The disclosed mold clamping device is applied to an injection molding machine employing the toggle mechanism driven by the servo motor to move a movable platen for the mold clamping. The toggle mechanism has a crosshead which is associated with the movable platen. The mold clamping device comprises a crosshead position detector for detecting a position of the crosshead in the toggle mechanism. More specifically, the crosshead has a stroke for a single cycle of the mold clamping operation. The stroke is divided into a plurality of regions. The mold clamping device also comprises a region determination unit for determining the region in which the crosshead is located upon the reception of an output from the crosshead position detector. Furthermore, the mold clamping device comprises a movable platen position calculating unit for use in approximating, as a linear equation, a correlation between the crosshead positions (regions in which. the crosshead is located) and the positions of the movable platen to calculate the "current" position of the movable platen by using the linear equation from the outputs of the region determination unit and the crosshead. position detector. A display unit displays the position of the movable platen calculated by the movable platen position calculating unit. The above-mentioned configuration provides the position of the movable platen calculated by the approximation with the linear equation discussed above.

However, the correlation between the positions of the crosshead and the movable platen is non-linear with a curved profile rather than linear. In this case, if a curve is divided into a plurality of regions, the linear approximation of the plurality of regions originated from the curve results in an error. Thus, the above-mentioned technique has an inherent problem of a difference between the calculated position and the position where the platen should be located. This means that the above-mentioned mold clamping device has some limitations in control accuracy for mold opening and closing positions.

Therefore, an object of the present invention is to improve the accuracy of controlling mold opening and closing positions.

SUMMARY OF THE INVENTION

The present invention is applied to a motor-driven mold clamping device comprising a servo motor, a movable platen, and a toggle mechanism operated by the servo motor to advance and retract the movable platen for clamping a mold.

According to an aspect of the present invention, the motor-driven mold clamping device comprises a setting unit for use in setting a position of the movable platen, a position detector for detecting a position of a crosshead in the toggle mechanism, and a control unit. The control unit approximates a correlation between the positions of the crosshead and the movable platen by using at least one function of a quadratic or higher (e.g., cubic, quartic, etc.) order. The control unit calculates the position of the crosshead by means of the approximated function with the position of the movable platen set by using the setting unit. The control unit then controls the position of the crosshead for the control of the opening and closing of the mold, the control being made in accordance with the detected position supplied from the position detector and the calculated crosshead position.

BRIEF DESCRIPTION OF THE DRAWINGS

For a more complete understanding of the present invention, reference should be made to the appended drawings, wherein.

DESCRIPTION OF THE PREFERRED EMBODIMENTS

Figure 1:
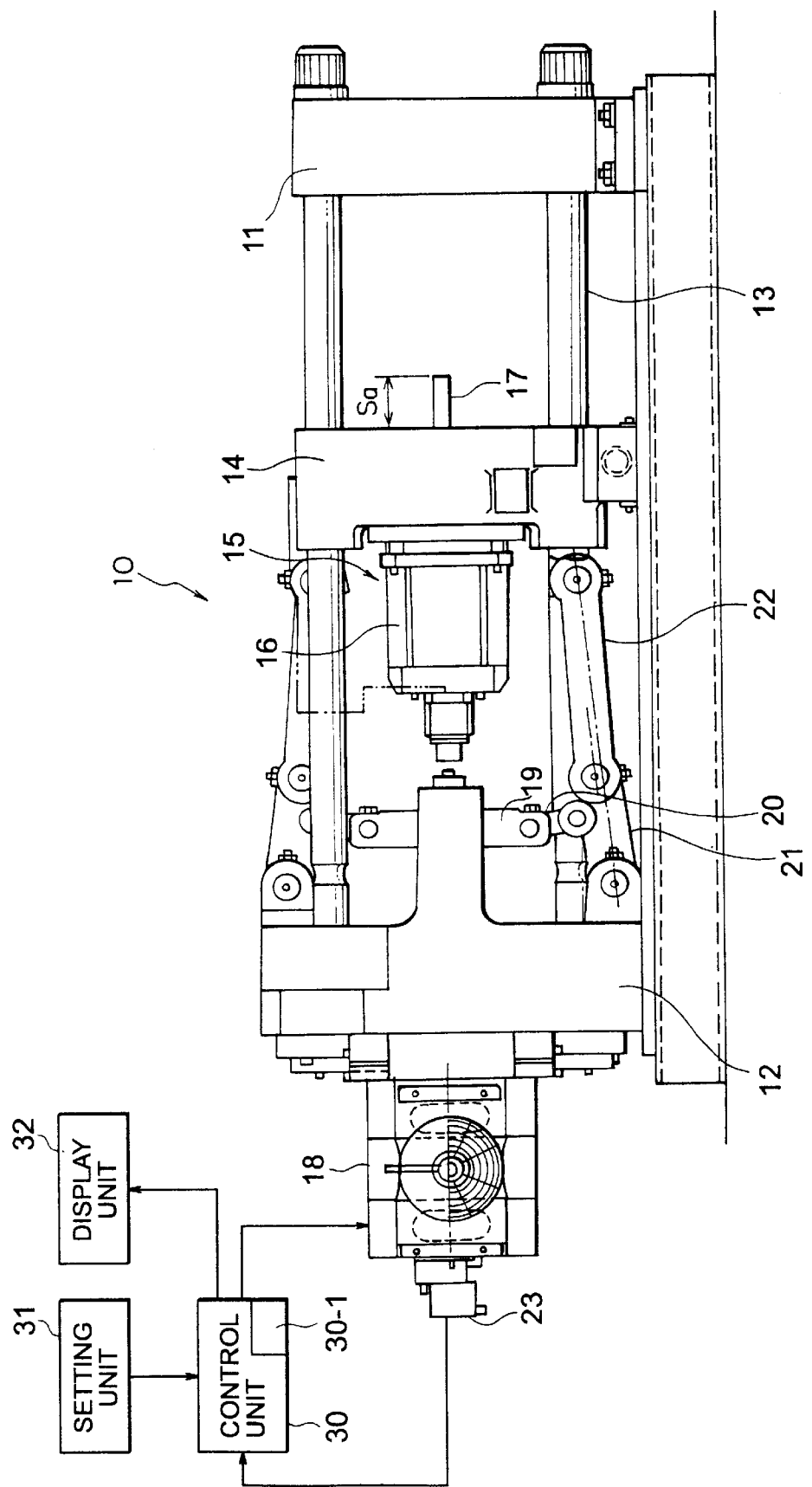
FIG. 1 is a view illustrating a configuration of a motor-driven mold clamping device according to a preferred embodiment of the present invention.

Referring to FIG. 1, a motor-driven mold clamping device according to a preferred embodiment of the present invention is described. A mold clamping device 10 comprises a fixed platen 11 and a toggle support 12. Four tie bars 13, only two of which are shown, are provided between the toggle support 12 and the fixed platen 11. A: movable platen 14 is opposed to the fixed platen 11 such that the movable platen 14 can freely be advanced and retracted along the tie bars 13. A fixed mold (not shown) is attached to the surface of the fixed platen 11 that is opposed to the movable platen 14. Likewise, a movable mold (not shown) is attached to the surface of the movable platen 14 that is opposed to the fixed platen 11.

An ejector pin feeder 15 is provided at the rear end of the movable platen 14. The ejector pin feeder 15 is for pushing an ejector pin (not shown) in order to eject a molded product. In the ejector pin feeder 15, a servo motor 16 for the ejection is used to advance and retract an ejector rod 17 by a stroke Sa.

A toggle mechanism is provided between the toggle support 12 and the movable platen 14. A servo motor 18 for the mold clamping is driven to advance and retract a crosshead 19 to generate a mold clamping force multiplied by a toggle magnification factor. This mold clamping force is used to advance the movable platen 14 (to the right in FIG. 1) to achieve the mold clamping of the mold.

The toggle mechanism is formed of toggle levers 20 and 21 and a toggle arm 22. The toggle lever 20 is pivotally supported on the crosshead 19. The toggle lever 21 is pivotally, supported on the toggle support 12. The toggle arm 22 is pivotally supported on the movable platen 14. The toggle lever 20 is linked to the toggle lever 21. The toggle lever 21 is linked to the toggle arm 22. A rotary encoder 23 is provided in the servo motor 18 to detect the position of the crosshead: 19 (hereinafter referred to as a "crosshead position"). The rotary encoder 23 detects the crosshead position by means of directly detecting the rotation speed of the servo motor 18. A position detection signal supplied from the rotary encoder 23 is delivered to a control unit 30.

The mold clamping device 10 itself of the type described is disclosed in Japanese Patent Laid-Open No. 9-164571 (164571/1997). The mold clamping device 10 is what is referred to as a "built-in driving type" and one feature thereof is that no mechanisms such as a belt is used for the transmission of the driving force. Since the mold. clamping device 10 is already known, no description is made here about the detailed configuration and structure, in particular, a ball screw mechanism used for translating a rotation movement of an output shaft of the servo motor 18 into a reciprocating motion of the crosshead 19.

Figure 2:
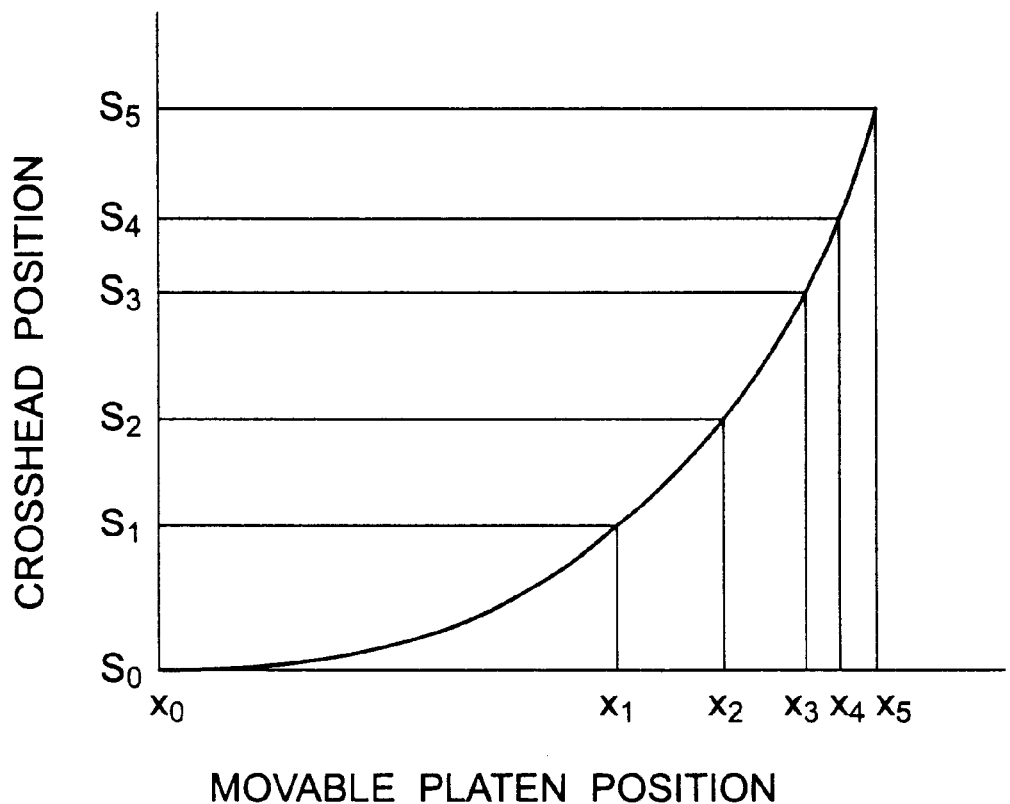
FIG. 2 is a graphical representation of a correlation between positions of a crosshead and a movable platen in the motor-driven mold clamping device in FIG. 1.
Figure 3:
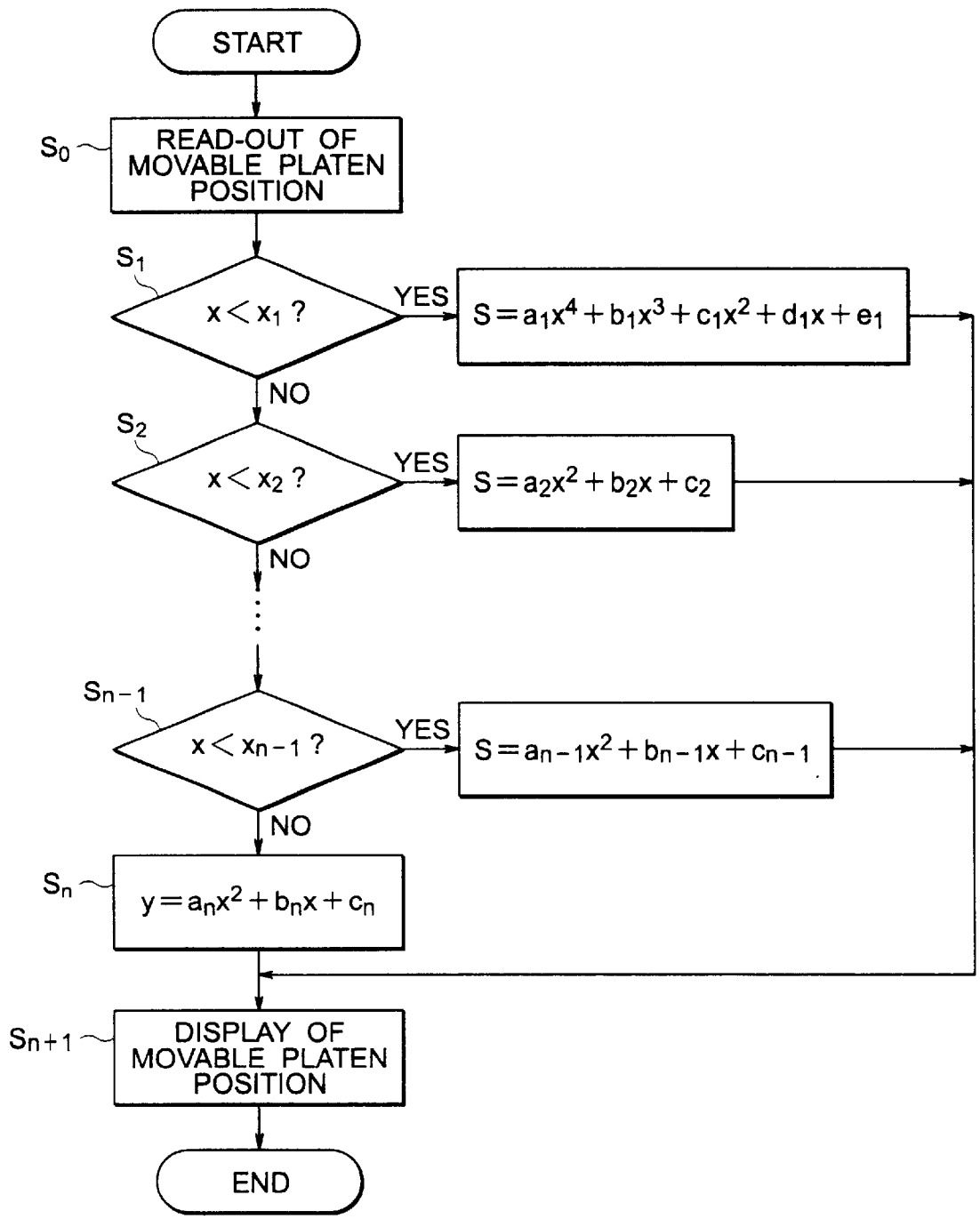
FIG. 3 is a flow chart for use in describing an operation to approximate the position of the crosshead carried by a control unit in FIG. 1.

Referring also to FIGS. 2 and 3, how the control unit 30 controls the mold opening and closing positions is described. The present invention is characterized by the control operation of the control unit 30. FIG. 2 is a graphical representation of a correlation between the crosshead position and the position of the movable platen 14 (hereinafter referred to as a movable platen position). The correlation has a curved profile. The motor-driven mold clamping device according to this embodiment has a setting unit 31 (see FIG. 1) for use in setting the movable platen position. The control unit 30 approximates the correlation between the crosshead position and the movable platen position by using a function of a quadratic or higher (e.g., cubic, quartic, etc.) order and calculates the crosshead position by means of the approximated function with the movable platen position set by using the setting unit 31. The control unit 30 then compares the calculated crosshead position and the crosshead position determined according to a result of detection made by the rotary encoder 23 to control the crosshead position such that the difference between these positions approaches to zero. In other words, the control unit 30 calculates the amount of movement of the crosshead 19 by using the calculated crosshead position and the current crosshead position to control the crosshead position based on the calculated amount of movement. In this manner, the mold opening and closing positions are controlled.

In particular, the control unit 30 divides the movable distance or the movable range where the movable platen 14 travels (i.e., the abscissa in FIG. 2) into a plurality of regions and approximates a correlation between the crosshead position and the movable platen position for each of the divided regions by using the function of a quadratic or higher order. In this embodiment, the movable range of the movable platen 14 is divided into five regions: $x_0-x_1$, $x_1-x_2$, $x_2-x_3$, $x_3-x_4$, and $x_4-x_5$.

Referring to FIG. 3, how the control unit 30 approximates the crosshead position is described. At a step S0, the control unit 30 reads the movable platen position that is previously set by using the setting unit 31. At a step S1, the control unit 30 determines whether the preset (read) movable platen position x is larger than a value x, defining the first region $x_0-x_1$. If the preset movable platen position is larger than the value $x_1$, then the control passes to a step S2. On the other hand, if the preset movable platen position is smaller than the value $x_1$, then the control unit 30 calculates the crosshead position by means of the curve approximation using the following quartic equation $a_1x^4+b_1x^3+c_1x^2+d_1x+e_1$. Each of $a_1$, $b_1$, $c_1$, $d_1$, and $e_1$ represents a constant.

Next, at the step S2, the control unit 30 determines whether the preset (read) movable platen position is larger than a value $x_2$ defining the second region $x_1-x_2$. If the preset movable platen position is larger than the value $x_2$ then the control passes to the subsequent step. On the other hand, if the preset movable platen position is smaller than the value $x_2$, then the control unit 30 calculates the crosshead position by means of the curve approximation using the following quadratic equation $a_2x^2+b_2x+c_2$. Each of $a_2$, $b_2$, and $c_2$ represents a constant.

The procedure similar to the above is repeated until the control unit 30 reaches the last, n-th region $x_{n-1}-x_n$. n represents a positive integer. For the last, n-th region, the control unit 30 calculates, at a step Sn, the crosshead position by means of the curve approximation using the following quadratic equation $a_nx^2+b_nx+c_n$. Each of $a_n$, $b_n$, and $c_n$ represents a constant.

At a step $S_{n+1}$, the control unit 30 calculates back the movable platen position using the curve approximation of the divided regions according to the crosshead position detected by the rotary encoder 23. The control unit 30 then displays the value obtained by this reverse calculation on a display unit 32 (see FIG. 1).

It is noted that the correlation as shown in FIG. 2 can previously be recognized. The control unit 30 may comprise a storage unit depicted at 30-1 for storing the movable platen position set by the setting unit 31. In this case, the control unit 30 may previously store in the storage unit 30-1 a table indicating the relation between the position of the movable platen 14 approximated by using the function of a quadratic or higher order for the above-mentioned regions and the corresponding crosshead position. This allows to access the storage unit with an address corresponding to the preset position of the movable platen 14 to read the crosshead position out of the storage unit 30-1.

Figure 4:
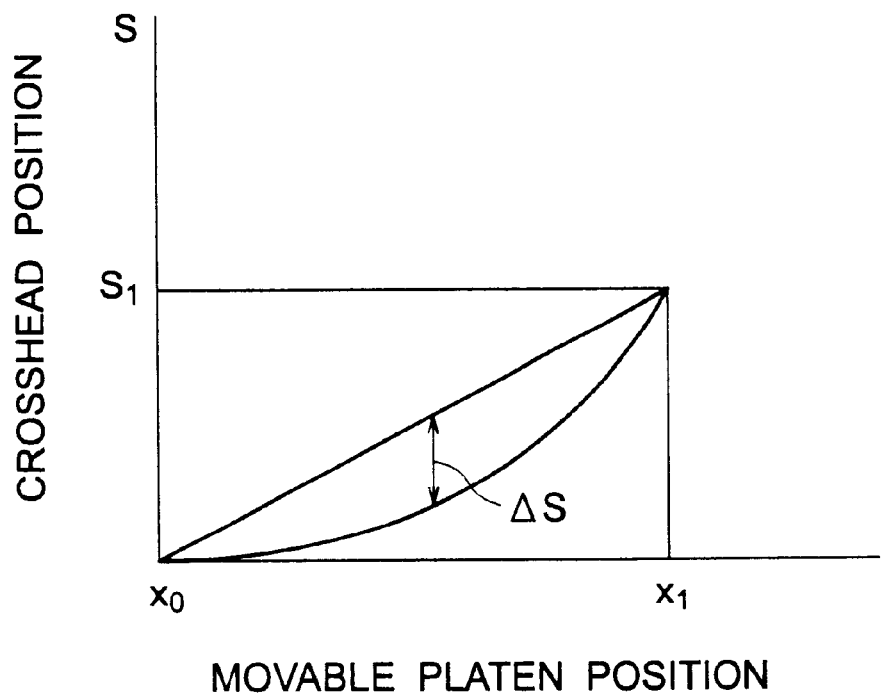
FIG. 4 is a graphical representation for use in describing another example of a curve interpolation described in FIG. 2.

Referring to FIG. 4, another example of the table-based crosshead position detection is described. Description is particularly made for the first region $x_0-x_1$ of the first through the n-th regions $x_0-x_1$ through $x_{n-1}-x_n$. More specifically, the first region $x_0-x_1$ is approximated using the linear approximation and an interpolation with a downward convex curve approximation is made to the result of the linear approximation. Of course, the similar procedure applies to the other regions. With this approach, the storage unit 30-1 stores the value obtained by subtracting a value Δ of the curve approximation from the value of the linear approximation: When an upward convex curve approximation is made, the value Δ is added to the value of the linear approximation.

While the preferred embodiments of the present invention have thus been described for the case where the present invention is applied to the built-in type motor-driven mold clamping device, the present invention is also applicable to other types of the motor-driven mold clamping devices.

As described above, according to the present invention, the movable platen position can be determined with high accuracy by using the curve interpolation of a quadratic or higher order. This improves control accuracy for the mold opening and closing positions.

Numerous modifications may be apparent to one of skill in the art, while remaining within the spirit and scope of the invention. To determine the scope of the invention, reference should be made to the appended claims.

What is claimed is:

1. A motor-driven mold clamping device comprising:
   a servo motor;
   a movable platen;
   a toggle mechanism driven by said servo motor to advance and retract said movable platen for clamping a mold, said toggle mechanism having a crosshead associated with said movable platen;
   a setting unit for setting a position of said movable platen;
   a position detector for detecting a position of said crosshead; and
   a control unit for approximating a correlation between the position of said crosshead and the position of said movable platen by using at least one mathematical function of a quadratic or higher order, said control unit calculating a calculated position of said crosshead by the at least one mathematical function with the position of said movable platen set by using said setting unit to control the position of said crosshead for the control of mold opening and mold closing positions, the control of the position being made in accordance with the detected position supplied from said position detector and the calculated crosshead position, wherein said control unit being configured to divide a movable range where said movable platen travels into a plurality of regions and said control unit also approximates a correlation between the position of said crosshead and the position of said movable platen for each of the divided regions by using the mathematical function.

2. A motor-driven mold clamping device as claimed in claim 1, wherein said control unit comprises a storage unit, said storage unit storing data representing the relation between the positions of said movable platen that is approximated by using the mathematical function for each of the divided regions and corresponding positions of said crosshead, said data being stored as a table in said storage unit.

3. A motor-driven mold clamping device as claimed in claim 1, wherein said control unit calculates the position of said movable platen using the mathematical function of the quadratic or higher order according to the crosshead position detected by said position detector, the mold clamping device further comprising a display unit on which the position of said movable platen obtained by the reverse operation is displayed.

4. A motor-driven mold clamping device as claimed in claim 2, wherein said control unit is configured to approximate a correlation between the position of said crosshead and the position of said movable platen for each of the divided regions by using a linear approximation, said control unit then interpolating with the curve approximation made to the result of the linear approximation, thereby controlling an actual position of the movable platen.

5. A motor-driven mold clamping device as recited in claim 1, wherein said mathematical function is a different mathematical function for each region of the plurality of regions.

6. A motor-driven mold clamping device as recited in claim 1, wherein said mathematical function is $$S = a_1 x^4 + b_1 x^3 + c_1 x^2 + d_1 x + e_1$$

wherein S equals crosshead position, $a_1$, $b_1$, $c_1$, $d_1$, and $e_1$ are each constants, and x is the position of said movable, platen set by using said setting unit.

7. A motor-driven mold clamping device as recited in claim 1, wherein said mathematical function is $$S = a_2 x^2 + b_2 x + c_2$$

wherein S equals crosshead position, $a_2$, $b_2$, and $c_2$ are constants, and x is the position of said movable platen set by using said setting unit.

8. A motor-driven mold clamping device as recited in claim 1, wherein said mathematical function is $$S = a_{n-1} x^2 + b_{n-1} x + c_{n-1}$$

wherein S equals crosshead position, $a_{n-1}$, $b_{n-1}$, and $c_{-1}$ are all constants, and x is the position of said movable platen set by using said setting unit.

9. A method for controlling a movable platen, said method comprising the steps of:
   providing a movable platen, a crosshead associated with the movable platen, a setting unit for setting a position of the movable platen, a position detector for detecting a position of the crosshead, and a control unit for dividing a movable range of the movable platen into a plurality of regions and for approximating a correlation between the position of the crosshead and the position of the movable platen for each region of the plurality of regions by use of at least one quadratic or higher order mathematical function;
   detecting the position of the crosshead with the position detector, and providing a position signal to the control unit;
   calculating a position of the movable platen based on the position signal and by the use of the at least one quadratic or higher order mathematical function.

10. A method as recited in claim 9, further comprising the steps of:
    setting a movable platen position of the movable platen into the setting unit;
    calculating by the control unit a position of the crosshead based on the movable platen position that is set by the setting unit and by the use of the at least one quadratic or higher order mathematical function; and
    controlling the crosshead by the control unit by the use of the position signal and the position of crosshead that is calculated by the control unit.

11. A method as recited in claim 9, further comprising the steps of:
    providing display means; and
    displaying by the display means the position of the movable platen, which is obtained by the calculation by the use of the at least one quadratic or higher order mathematical function.

12. A method as recited in claim 9, wherein said approximation comprises the step of approximating the correlation between the position of said crosshead and the position of said movable platen by the use of a linear approximation, and then interpolating with the curve approximation made to the result of the linear approximation.

13. A method for controlling a movable platen, said method comprising the steps of:
    providing a movable platen, a crosshead associated with the movable platen, a setting unit for setting a position of the movable platen, a position detector for detecting a position of the crosshead, a control unit for dividing a movable range of the movable platen into a plurality of regions and for approximating a correlation between the position of the crosshead and the position of the movable platen for each region of the plurality of regions by the use of at least one mathematical function of a quadratic or higher order, and a lookup table for preliminarily storing a position of the movable platen and a position of the crosshead corresponding to the position of the movable platen;

setting a movable platen position of the movable platen into the setting unit;

reading out from the lookup table the position of the crosshead corresponding to the position of the movable platen based on the movable platen position set into the setting unit;

detecting a position of the crosshead with the position detector, and providing a position signal to the control unit; and controlling the crosshead by the control unit by the use of the position signal and the position of the crosshead read from the lookup table.

* * * * *